United States Patent
Hosie et al.

(10) Patent No.: US 10,929,554 B2
(45) Date of Patent: *Feb. 23, 2021

(54) HANDLING SENSITIVE DATA IN AN APPLICATION USING EXTERNAL PROCESSING

(71) Applicant: International Business Machines Corporation, Armonk, NY (US)

(72) Inventors: John Hosie, Eastleigh (GB); Daniel J. McGinnes, Southampton (GB); Martin A. Ross, Gosport (GB); Craig H. Stirling, Hedge End (GB); Dominic J. Storey, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,482

(22) Filed: Jun. 13, 2019

(65) Prior Publication Data
US 2019/0294812 A1    Sep. 26, 2019

Related U.S. Application Data

(63) Continuation of application No. 15/271,378, filed on Sep. 21, 2016, now Pat. No. 10,387,670.

(51) Int. Cl.
*G06F 21/60* (2013.01)
*G06F 21/62* (2013.01)

(52) U.S. Cl.
CPC ........ *G06F 21/6218* (2013.01); *G06F 21/604* (2013.01); *G06F 21/6245* (2013.01)

(58) Field of Classification Search
None
See application file for complete search history.

(56) References Cited

U.S. PATENT DOCUMENTS

| 8,108,912 B2 | 1/2012 | Ferris |
| 8,458,487 B1 | 6/2013 | Palgon et al. |
| (Continued) | | |

FOREIGN PATENT DOCUMENTS

| CN | 104052750 | 9/2014 |
| CN | 104065651 | 9/2014 |
| EP | 2947569 | 11/2015 |

OTHER PUBLICATIONS

Jul. 18, 2019; UK Patent Application No. 1905280.2, 3 pages.
(Continued)

*Primary Examiner* — Joseph P Hirl
*Assistant Examiner* — Hassan Saadoun
(74) *Attorney, Agent, or Firm* — Schmeiser, Olsen & Watts, LLP; Nicholas L. Cadmus

(57) ABSTRACT

A method and system for handling sensitive data required by an application in a secure computer system. The secure computer system transforms sensitive data in a request message from a data format required by the application into a data format required by a service in an external computer system. The secure computer system tokenizes the sensitive data by replacing the sensitive data with tokenized data and stores a mapping between the sensitive data and the tokenized data in the secure computer system. The secure computer system sends the request message to an external computer system and receives, from the external computer system, a response message that includes annotations for the tokenized data with transform instructions for transforming the transformed sensitive data from the data format required by the service into the data format required by the application. The secure computer system replaces the tokenized data with the sensitive data.

20 Claims, 8 Drawing Sheets

(56) References Cited

U.S. PATENT DOCUMENTS

| | | | |
|---|---|---|---|
| 8,826,443 B1* | 9/2014 | Raman | G06F 11/004 |
| | | | 726/26 |
| 8,843,998 B2 | 9/2014 | Fu et al. | |
| 8,984,132 B2 | 3/2015 | Sailer et al. | |
| 9,021,135 B2 | 4/2015 | Ang et al. | |
| 9,069,599 B2 | 6/2015 | Martinez et al. | |
| 2003/0033161 A1 | 2/2003 | Walker et al. | |
| 2003/0147534 A1 | 8/2003 | Ablay et al. | |
| 2006/0075228 A1* | 4/2006 | Black | H04L 63/104 |
| | | | 713/167 |
| 2007/0030528 A1 | 2/2007 | Quaeler et al. | |
| 2009/0089663 A1 | 4/2009 | Rebstock et al. | |
| 2010/0313239 A1 | 12/2010 | Chakra et al. | |
| 2012/0239380 A1 | 9/2012 | Cumby et al. | |
| 2012/0278897 A1 | 11/2012 | Ang et al. | |
| 2013/0046811 A1 | 2/2013 | Park et al. | |
| 2014/0359047 A1 | 4/2014 | Lee et al. | |
| 2014/0136832 A1 | 5/2014 | Klum et al. | |
| 2015/0106881 A1 | 4/2015 | Wharton et al. | |
| 2015/0156131 A1 | 6/2015 | Pomerantz | |
| 2015/0163285 A1 | 6/2015 | Chakra et al. | |
| 2015/0370594 A1 | 12/2015 | Ghosh et al. | |
| 2016/0004882 A1 | 1/2016 | Ballai et al. | |
| 2016/0292441 A1* | 10/2016 | Stuntebeck | G06F 21/6218 |
| 2018/0082072 A1 | 3/2018 | Rosie et al. | |
| 2018/0083924 A1 | 3/2018 | Rosie et al. | |
| 2019/0075086 A1 | 3/2019 | Rosie et al. | |

OTHER PUBLICATIONS

Huang et al., Efficiently Secure Data Privacy on Hybrid Cloud, URL: http://ieeexplore.ieee.org/xpl/articleDetails.jsp?arnumber=6654806, Source: Jun. 9-13, 2013, pp. 1936-1940.

Method and Apparatus for Partitioning Applications for the Interoperability Enablement of Hybrid (Public and Private) Cloud, Source: IPCOM000235888D Publication Date: Mar. 28, 2014, 4 pages.

Ahmadian et al., Security of Applications Involving Multiple Organizations and Order Reserving Encryption in Hybrid Cloud Environments, Source: May 19-23, 2014, URL: http://ieeexplore.ieee.org/xpl/articleDetails.jsp?arnumber=6969476, pp. 894-903.

Cloud Tokenization, Keep sensitive information inside your network to assure data residency and sovereignty, URL: http://www.ciphercloud.com/technologies/tokenization/, 3 pages.

Dave Shackleford, Cloud Tokenization, Retrieved from Internet Sep. 20, 2016, URL: http://searchcloudsecurity.rechtarget.com/tip/Cloud-tokenization-Why-it-might-replace-cloud-encryption, 3 pages.

Tokenization of on Premise Data to Utilize in Community Management Services Source: IPCOM000210107D Publication Date: Aug. 25, 2011, 3 pages.

Cloud Tokenization Premier, Retrieved from Internet Sep. 20, 2016, URL: http://perspecsys.com/resources/cloud-tokenization-premier/, 4 pages.

Patent application for U.S. Appl. No. 15/271,313, filed Sep. 21, 2016.

Office Action (dated Apr. 20, 2018) for U.S. Appl. No. 15/271,378, filed Sep. 21, 2016.

Amendment (dated Jul. 20, 2018) for U.S. Appl. No. 15/271,378, filed Sep. 21, 2016.

Final Office Action (dated Nov. 1, 2018) for U.S. Appl. No. 15/271,378, filed Sep. 21, 2016.

Final amendment (dated Jan. 2, 2019) for U.S. Appl. No. 15/271,378, filed Sep. 21, 2016.

Advisory Action (dated Feb. 21, 2019) for U.S. Appl. No. 15/271,378, filed Sep. 21, 2016.

RCE (dated Feb. 21, 2019) for U.S. Appl. No. 15/271,378, filed Sep. 21, 2016.

Notice of Allowance (dated Apr. 3, 2019) for U.S. Appl. No. 15/271,378, filed Sep. 21, 2016.

ISR and Written Opinion dated Dec. 25, 2017, 11 pages.

Office Action (dated Apr. 20, 2018) for U.S. Appl. No. 15/271,313, filed Sep. 20, 2016.

Notice of Allowance (dated Sep. 28, 2018) for U.S. Appl. No. 15/271,313, filed Sep. 21, 2016.

Office Action (dated Apr. 20, 2018) for U.S. Appl. No. 15/271,313, filed Sep. 21, 2016.

Amendment (dated Jul. 20, 2018) for U.S. Appl. No. 15/271,313, filed Sep. 21, 2016.

U.S. Appl. No. 16/180,134, filed Nov. 5, 2018.

Friedman, Jack P.; List of IBM Patents or Patent Applications Treated as Related; Jun. 25, 2020; 1 page.

\* cited by examiner

HANDLING SENSITIVE DATA IN AN APPLICATION USING EXTERNAL PROCESSING

This application is a continuation application claiming priority to Ser. No. 15/271,378, filed Sep. 21, 2016, now U.S. Pat. No. 10,387,670 issued Aug. 20, 2019.

TECHNICAL FIELD

The present invention relates to sensitive data protection, and more specifically, to handling sensitive data in an application using external processing.

BACKGROUND

Many businesses are looking to run some of their computing processing on hardware provisioned by an external agency to reduce capital expenditure and be more agile in response to variable demands on capacity. The biggest inhibitors to moving the computer processing into the cloud is security and privacy.

A typical example for an application integration style of processing is where an application in a secure local environment requires some processing or information that is provided by an external service. This information is obtained by the application sending a request message to the external service. The request message may contain sensitive information, which is required for the operation of the service. A response message may be returned by the service to the application.

Often, this kind of use case requires an integration flow because the application and service both expect different formats of the request message and response message. In this case, there would be two integration flows: one to transform the request message from the application's data format into the service's data format and another to transform the response message.

These integration flows may do some manipulation of the data, including those sensitive fields. However, in many cases, regulatory control forbids a company to allow the data to be transmitted outside of the company's network or out of the country.

Therefore, there is a need in the art to address the aforementioned problems.

SUMMARY

Embodiments of the present invention provide a method, and an associated data processing system and computer program product, for handling sensitive data required by an application in a secure computer system comprising one or more processors. The one or more processors identify sensitive data in one or more data aspects of a request message. The one or more processors tokenize the sensitive data in the one or more data aspects by replacing the sensitive data with tokenized data and store a mapping between the sensitive data and the tokenized data in the secure computer system. The one or more processors send the request message including the tokenized data to an external computer system that is external to the secure computer system. After sending the request message to the external computer system, the one or more processors receive a response message from the external computer system. The response message includes annotations for the tokenized data with transform instructions for the tokenized data. The one or more processors replace the tokenized data with the sensitive data and perform the transform instructions on the sensitive data.

Embodiments of the present invention provide a method, and an associated data processing system and computer program product, for handling sensitive data required by an application in a secure computer system that is external to an external computer system comprising one or more processors. The one or more processors receive, from the secure computer system, a request message that includes one or more data aspects having tokenized data. The one or more processors convert the request message by applying one or more transforms to the one or more data aspects, wherein applying one or more transforms includes replacing a tokenized value of one data aspect of the one or more data aspects with annotated tokenized data with transform instructions. The one or more processors send a response message to the secure computer system. The response message includes the one data aspect with the annotated tokenized data with the transform instructions for replacing the tokenized data with the sensitive data and for performing the transform instructions on the sensitive data.

The present invention provides the advantage of enabling a majority of heavy computational transformation processing on non-sensitive data to be carried out in an external processing environment. Sensitive data aspects are tokenized while in the external processing environment and transformation processing on the sensitive data is carried out when back in a secure environment in accordance with instructions provided by the external processing environment.

Identifying sensitive data in a data aspect of a request message for processing may include reading metadata for data aspects of a message from a message model, which has the advantage that the sensitive data aspects may be annotated in a message model by a security officer separately from the development of an application.

Receiving a processed message at the secure environment may include identifying data aspects that have not been fully transformed for further processing at the secure environment.

Replacing the tokenized data with the sensitive data and performing the transform instructions on the sensitive data may be deferred until the sensitive data is required by the application and may be implemented in response to a subsequent determination that the sensitive data is required by the application, which has the advantage that the transform of the sensitive data may be carried out at a time which suits the application and may reduce associated computational work.

BRIEF DESCRIPTION OF THE DRAWINGS

The present invention, both as to organization and method of operation, together with objects, features, and advantages thereof, may be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system enable the handling of sensitive data in an application using external processing. The method enables the use of a remote entity such as in a cloud, distributed environment, or other external processing environment to be provisioned to perform processing of an integration flow without any of the sensitive data leaving a secure processing environment.

In one embodiment, cloud provisioned compute instances may be used to perform a bulk of the processing of an existing integration flow without any sensitive data leaving the enterprise's on-premises data center.

Figure 1:
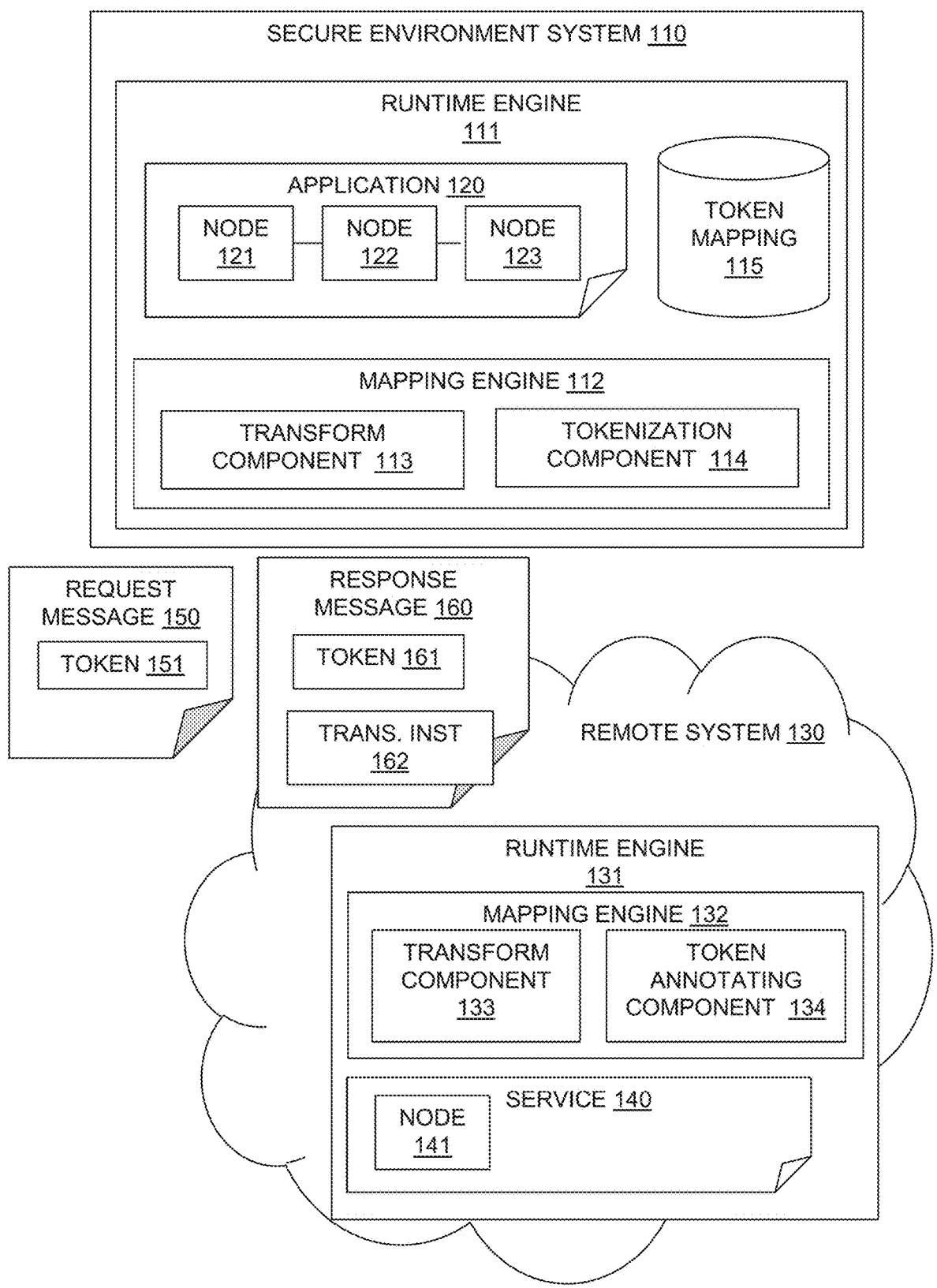
FIG. 1 shows an environment that includes a secure environment system and a remote system, in accordance with embodiments of the present invention.

FIG. 1 shows an environment 100 which is a data processing system that includes a secure environment system 110 and a remote system 130, in accordance with embodiments of the present invention. The secure environment system 110 may be provided, for example in the form of an on-premise computing system or network of systems. Such a secure environment system 110 may be protected by a firewall and other security measures to ensure that confidential or sensitive data is protected.

The secure environment system 110 may include a runtime engine 111 for an application 120. The application 120 may comprise multiple processing nodes 121-123 of subsets of the application processing.

The remote system 130, such as a computer system provided by a public cloud, includes a runtime engine 131 and may be capable of providing processing services for the application 120, for example by providing a service 140 for carrying out one or more processing nodes 141 for the application 120. The remote system 130 may be a computer system functioning as a remote or external computer system that is remote or external with respect to the secure environment system 110 (e.g., secure computer system 110). The runtime engine 131 includes mapping engine 132.

In an example, the application 120 may require some information or processing that is provided by the service 140. This information or processing may be obtained by the application 120 from the service 140 by sending a request message 150 to the service 140. The request message 150, which includes token 151, might contain sensitive data such as a person's national insurance number, social security number or credit card number. The service 140 may wish to use the sensitive data, for example, in order to calculate the probability of that person defaulting on a loan of a certain value. A response message 150 from the service 140 to the application 120 may include the person's credit rating as well as some other details about the person and their credit history.

Often, this kind of use case will require an integration flow because the application 120 and service 140 both expect different formats of a request message 150 (from the application 120 to the service 140) and a response message 160 (from the service 140 to the application 120) which includes token 161 and transform instance 162. In this case, there would be two integration flows: one integration flow to transform the request message 150 from the application's data format into the service's data format and another integration flow to transform the response message 160.

In an integration product such as IBM Integration Bus (IIB) (formerly Websphere Message Broker, where IBM® and Websphere® are trade marks of International Business Machines Corporation), there are a variety of transform technologies available. In many cases, the transformation engine provides a pure functional programming model. A pure functional transformation language (such as the Graphical Data Mapper in IIB) provides assurance that no transform will have any side effect on any other transform.

The mapping from one data structure to another data structure such as from the application 120 to the service 140 is composed of a number of transforms which may be carried out by transform components 113, 133 at mapping engines 112, 132 in each environment, respectively.

Each transform has zero, one or more inputs and one or more outputs. Inputs and outputs to the transforms are fields in the input and output data structures for the mapping. For example, a transform might convert a field's value to upper case or concatenate two fields into one field. These transforms are completely independent of each other. For example, it is not possible to use the output of one transform as the input to the other and it is not possible to control or predict the order in which transforms are executed.

With the described method, this mapping may be burst on the remote system (e.g., public cloud) 130 to offload computational workload while not sending the sensitive data. Instead, the mapping engine 112 of the secure environment system 110 includes a tokenization component 114 for replacing each sensitive field with a token that can be used later by a compute instance on the secure environment system 110 to determine the original value of that sensitive field. A tokenization mapping 115 may be maintained in the secure environment system 110, mapping the tokens to the sensitive data.

The cloud instance of the mapping engine 132 may include a token annotating component 134 which may detect any transforms that have one of these tokenized fields as their input and instead of transforming the value and writing the transformed value to the output field, the token annotating component 134 will store the token plus instructions of what transform would have been performed. For any transforms that have non-tokenized input, a transform component 133 may execute the transform as normal and write the transformed value to the output.

Once a partially transformed response message 160 returns to the secure environment system 110 compute instance, those fields that have not been fully transformed will be identified and the transform will use the token to determine the original value(s) and then execute the instructed transforms.

In another embodiment of an environment in which the described method and system may be implemented, multiple data centers may be under the control of the same multinational company. A message may be sent from a first data center to a second data center, and a response provided back to the first data center. However, it may be later determined (for example, due to a law change or one data center moved) that this workflow has become unacceptable as some of the data cannot be sent in the message since the data is not allowed to leave the country. This would mean that the application would have to be re-designed and significant work undertaken to re-implement and test.

The described method may be employed in this scenario, in which case the only change would be that the message model describing the data may need to be updated with the new constraint and tokenization of the sensitive data may be implemented. The tokenized message may be sent to the second data center, which may carry out processing and respond with annotations of the transform to be applied to any tokenized field.

Figure 2:
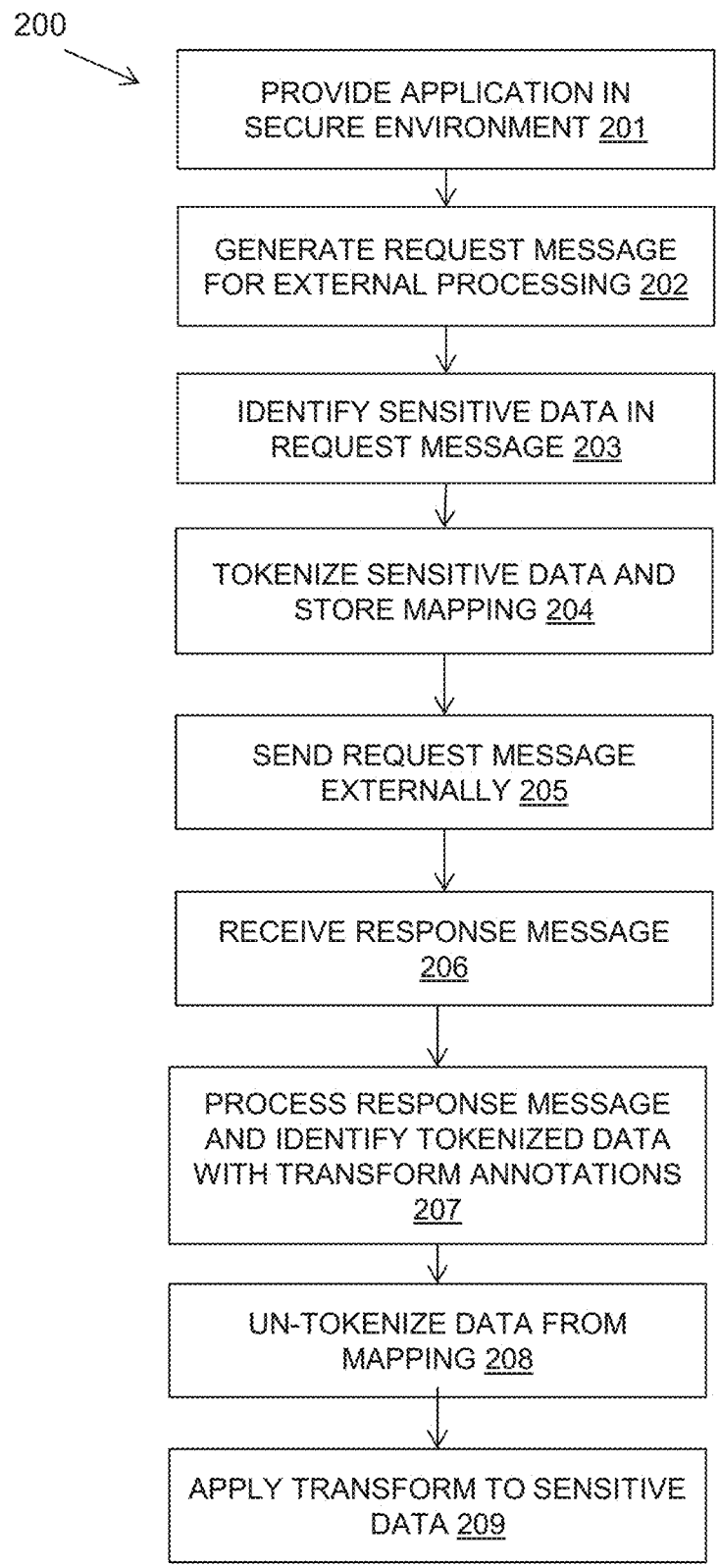
FIG. 2 is a flow diagram of an example of an aspect of a method performed by the secure environment system of FIG. 1, in accordance with embodiments of the present invention.

FIG. 2 is a flow diagram 200 of an example of an aspect of a method performed by the secure environment system 110 of FIG. 1, in accordance with embodiments of the present invention. The method of FIG. 2 is carried out at a secure environment.

An application 120 may be provided (step 201) in a secure environment system 110 at a runtime engine 111. A request message 150 for external processing may be generated (step 202). Sensitive data in the request message 150 may be identified (step 203) which may be implemented by reading metadata associated with data aspects of the request message 150.

In the described method and system, a description or model of a data structure, which may be for example in the form of a message model, may be annotated to identify data aspects that include sensitive data. The data aspects may include aspects, such as fields or structures, or elements within the structures. In one embodiment, the sensitive data may be identified as being the data in the data aspects of the request message 150 that matches metadata in the message model.

The method may tokenize (step 204) the data aspects that are identified as including sensitive data which may involve replacing a sensitive data value with a token and providing a mapping at the secure environment system 110 of the token to the sensitive data value.

The request message 150 may then be sent (step 205) externally from the secure environment system 110 to a remote system 130 for processing with the tokenized values. The request message may 150 be processed by the external system 130 as will be described in FIG. 3 below. During the processing, a tokenized value may be annotated with instructions regarding a transform that is required to be performed once the sensitive data is re-inserted when back in the secure environment system 110. The processing in the external environment of the remote system 130 may carry out transforms on non-tokenized data aspects. Additional node processing may be carried out at the external system before returning the response message.

A response message 160 may be received (step 206) at the secure environment system 110 with tokenized values including annotations of transforms to be carried out on the sensitive data values.

The response message 160 may be processed (step 207) and tokenized data with transform annotations identified at the secure environment system 110. Any tokenized values may be un-tokenized by being looked up (step 208) in the mapping and replaced with the sensitive data.

The transforms as defined in the annotations may be applied (step 209) to the sensitive data in the secure environment system 110

The replacement of tokenized values and the application of the transforms may be carried out immediately upon receipt of the response message 160 or deferred until an appropriate time in the processing at the secure environment system 110. Replacing the tokenized data with the sensitive data and performing the transform instructions on the sensitive data may be deferred until the sensitive data is required by the application 150 and may be implemented in response to a determination that the sensitive data is required by the application 150.

Figure 3:
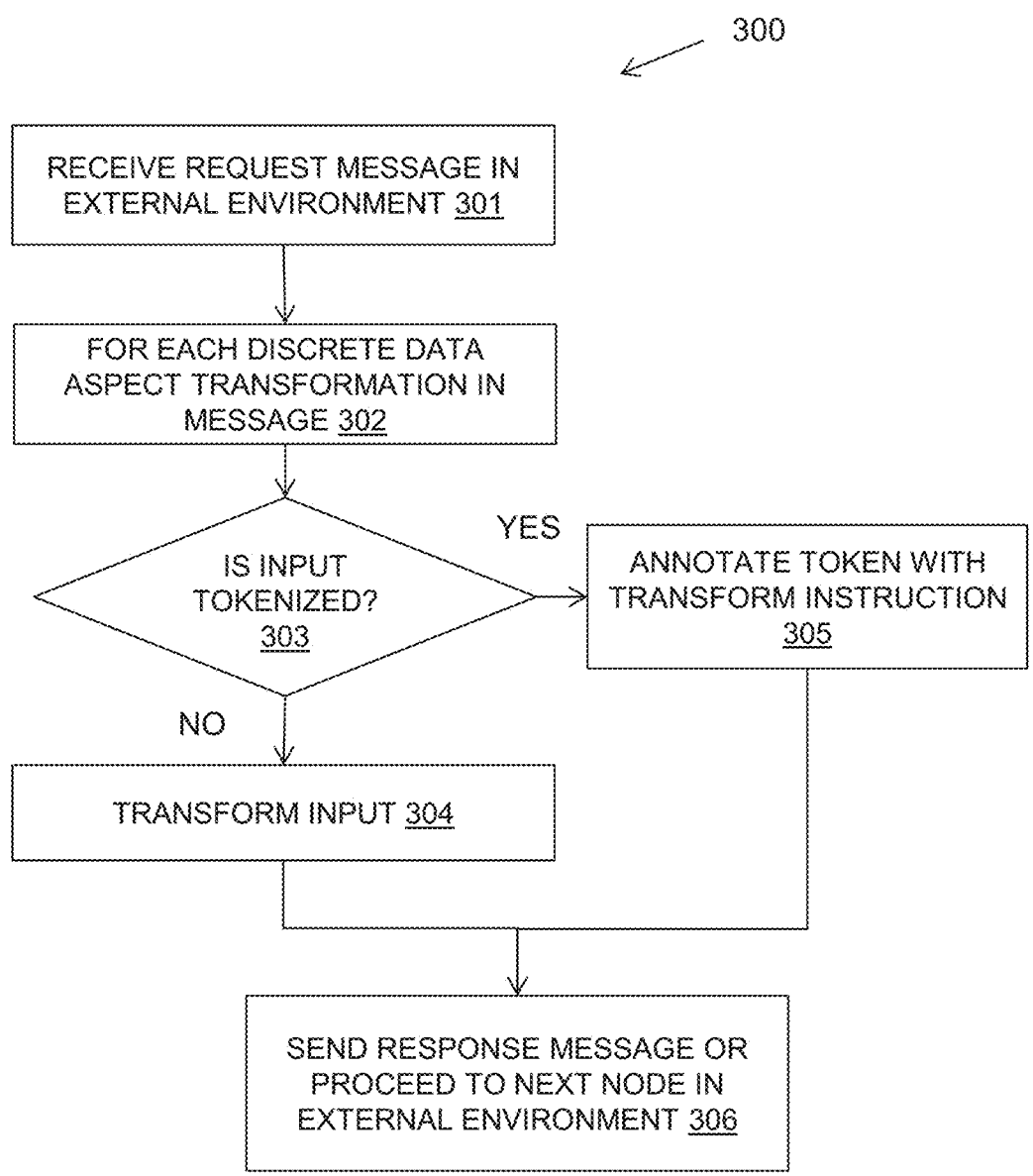
FIG. 3 is a flow diagram of an example of an aspect of a method performed by the remote system of FIG. 1, in accordance with embodiments of the present invention.

FIG. 3 is a flow diagram 300 of an example of an aspect of a method performed by the remote system 130 of FIG. 1, in accordance with embodiments of the present invention. The method of FIG. 3 is carried out at an external processing environment capable of processing a portion of an application on behalf of an application in a secure processing environment.

A message request 150 may be received (step 301) at the external environment of the remote system 130. For each discrete data aspect transform (302) in a message transformation, step 303 may determine if an input of the message is tokenized.

If an input is not tokenized (NO branch from step 303), then a transform at the external environment of the remote system 130 may be carried out (step 304). However, if an input is tokenized (YES branch from step 303), then the token may be annotated (step 305) with the transform instruction.

A response message 160 may then be sent (step 306) to the secure environment system 110 where any annotated transforms are carried out once the tokenized data has been replaced with the sensitive data. Alternatively, there may be additional node processing to carry out at the external processing environment in which case a message may be transferred to a next processing node.

Possible transforms on data aspects which may be annotated for tokenized data may include the following:

1. Simple functions on a token such as trim, sub-string, lowercase, etc.
2. Multi-element functions such as merge, concatenate, etc. of multiple tokens or a mix of tokens and literal values.
3. Database or cache look-ups may also be annotated as instructions. The inbound message may contain a key to look up a value in a database or a distributed cache where a store may only be located or accessible on-premise. The output from the look-up may be mapped to a field in the outbound message that is marked as secure and which will require tokenization if the outbound message is to be sent from the secure environment system 110.

The transform logic itself may call out to another service (for example, a database, cache, system, etc.) to say "The value of field X in the output of a transform is the value held in the database when the value in field Y of the input message is looked up" where field Y of the input message may be secure and tokenized. So the annotation to complete may include details of the system to interact with.

Figure 4:
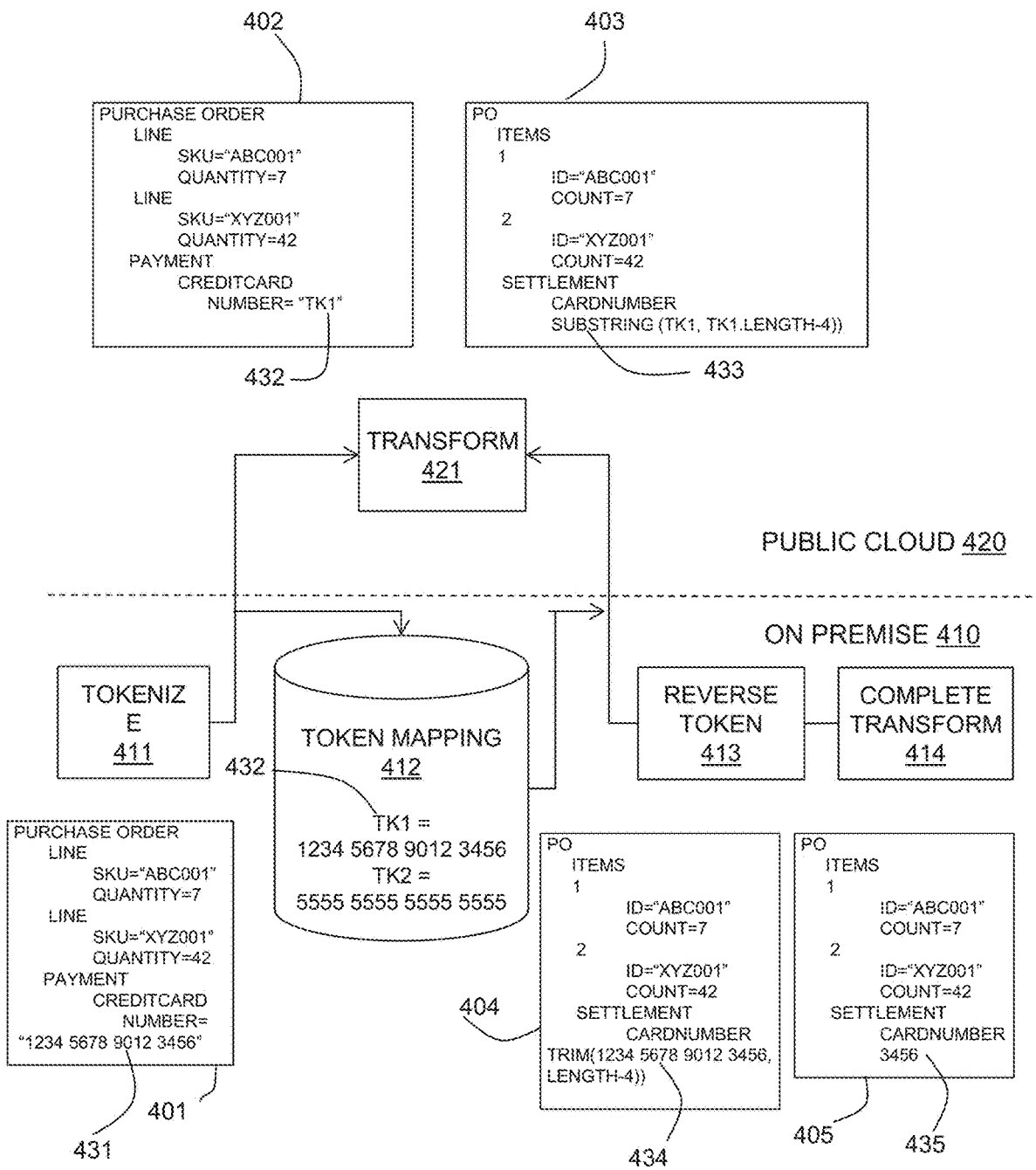
FIG. 4 is a schematic diagram of an illustrative example implementation of a method, in accordance with embodiments of the present invention.

FIG. 4 is a schematic diagram of an illustrative example implementation of a method, in accordance with embodiments of the present invention. The method of FIG. 4 is carried out at a secure environment, in this case on-premise 410 and processing the method is carried out at an external environment, in this case a public cloud 420.

Request message 401 is sent from an application through the on-premise instance of the integration solution. The request message 401 contains a credit card number "1234 5678 9012 3456" 431 that is considered as Personally Identifiable Information (PII). A tokenize function 411 replaces the credit card number with a unique token ID "TK1" 432 to create request message 402 and stores a mapping 412 of the actual value 431 to the token 432. This mapping 412 is stored in a secure location in the on-premise system 410.

The request message 402 is sent into the cloud instance of the transformation engine to be converted into the correct format for the destination service. This is shown by transform 421 that includes the transformation engine. The transform 421 is in the public cloud 420 This version of the request message 402 has no PII included because the token 432 has replaced the PII.

The transformation engine converts the whole message 402, as per the configuration of the mapping. Because the credit card number has been tokenized to token 432, the transform 421 replaces the token 432 with the correct destination field. The value of the correct destination field is set to information about the transform function(s) that was configured for this particular field mapping. In this case, the substring( ) function which will return the last 4 digits results in the field "substring(TK1, TK1.length-4)" 433 in partially transformed message 403. For all other fields, the transform 421 is applied at this stage and the actual values of the other fields are written as follows.

The partially transformed message 403 is sent back to the on-premise integration engine. A reverse token function 413 retrieves the actual value associated with token "TK1" from the secure storage token mapping 412 and transforms the partially transformed message 403 into partially transformed message 404 containing the actual values of the other fields.

The partially transformed message 404 is sent to a complete transform 414 step. At this stage, the partially transformed message 404 has the original actual value and information about what transform is to be applied, in this case "substring("1234 5678 9012 3456", length-4)" 434.

The complete transform 414 step performs the intended transform by retrieving the last four digits of the card number ("3456" 435) to create correctly formatted message 405 and sends the correctly formatted message 405 to the destination service.

The example here shows that the bulk of the data is not sensitive and may be transformed in the cloud instance of the transformation engine in public cloud 420. The credit card number is only processed on premise 410 but the transformation logic 421 that ran on the cloud instance of the transformation engine in public cloud 420 determined the function to be applied to that field.

The bulk of computational processing is likely to be on non-sensitive data, thus the described method provides additional flexibility, resilience and a performance advantage.

Advantageously, the on-premise steps to "Reverse Tokens" and "Complete Transform" may be executed immediately or may be deferred until required. For example, the completed transformation may not be required until a serialization step, or until the particular field is parsed. This enables the methods described herein to work with both "on demand" and "immediate" parsing techniques.

With immediate parsing, the "reverse token" and "complete transform" steps may be performed immediately. However, with on demand or lazy parsing, this action may be deferred until needed. For instance, when the message comes back to the secure environment, there might be the following logic:

Route on header→Log header→Transform→Output.

It may be that there is one field in the message body that needs the reverse token and complete transform steps applied. The first two nodes are accessing data only in the message header, so the final value of that field is not yet needed. Next, the transform may be performed and then the message is outputted. The output will serialize the whole message and put the whole message to a message queue, for example.

Some possible options are as follows:

The transform may transform the message without changing that field (but keeping that field in the output message) so the value is not needed until the output is serialized.

The transform may transform the message and need that field value, so the token may be reversed and the transform completed then.

The transform may just remove the field from the message, so the value is not needed at all. In this case, parsing on-demand or when needed means the computational work associated with the reverse token and complete transform has been avoided.

An additional example, may be as follows with each step being a node:

Input→Log→Transform Request→Call Service→Transform Response→Output.

The transform nodes may use the most processing resource. A message may be received at input in the secure environment, and the message may be logged in the same environment. The method may then tokenize secure data and send the message to the cloud to do the heavy transformation work (i.e. cloud burst the processing). The transformed message may be returned to the secure environment where the transformation may be completed on the secure data. A call may then be made to the service that provides information or some processing, such as a credit rating (in the given example, the secure data in the form of a card number has just the last 4 digits extracted so can now be sent). Then the response from the service may be received on premise and another transform may be carried out. It may be selected to cloud burst this processing again, if deemed appropriate, which may or may not include further tokenization of data before returning to the output in the secure environment.

A further example may be as follows with each step being a node:

Input→Log→Transform→Route→Transform→Call external service→Transform→Log→Output.

This could all be performed in the secure environment, where an input message is received, logged, and transformed to intermediate message structure, then routed to a next node based on a field value (i.e., it may be decided which is the next type of transformation to execute), then perform the second transformation to call an external service, transform the response and log the transformed response before responding. Here, the three nodes that do "transform→route→transform" may possibly be "cloud burst" before returning to the secure environment to complete the transformation before calling the external service. Here the annotations on the message fields about transformation to complete on tokenized data would propagate through the nodes in the remote cloud environment and then be completed when the message returns to the secure environment before invoking the external service.

The described method enables the use of transformations that were developed without this use case in mind. Using a pure functional transformation language, such as Graphical Data Mapper, the processing may be separated based on sensitivity of the input data.

The method combines a tokenizing technique with a pure functional programming engine such as the graphical mapper to maximize the amount of processing that can be off-loaded to the cheaper, more scalable but less secure compute instances on the cloud.

The value here is that many more businesses may use cloud compute processing without fear of violating regulations that control PPI and other sensitive data.

The described method may be provided in a cloud bursting scenario where, for instance, all processing is carried out on-premise, but if additional resources are needed then some of the processing can be sent to the cloud; for example, if there is a spike in workload on black Friday. At that point, or determined on deployment or by analysis, certain discrete logic (processing nodes) may be offloaded to the cloud. These nodes may be deployed in the cloud when the application is originally deployed and utilized when needed.

Another scenario may be a distributed application. There may be provided a hybrid environment in which public and private environments that are linked and when an application is deployed to the hybrid environment, any secure processing is to be done on premise, but to limit resource usage on-premise, anything else may be processed in the public cloud environment.

With the described method, the communications and nodes need not be trusted or secure enabling new business models and revenue.

Figure 5A:
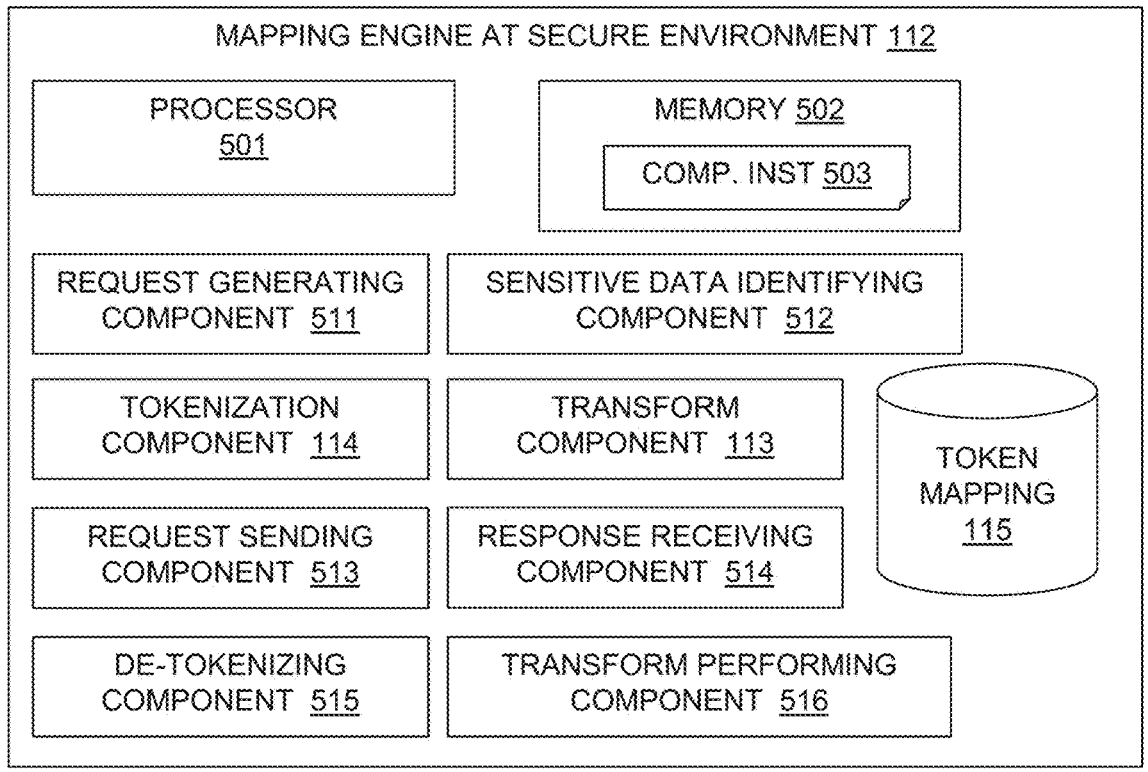
FIGS. 5A and 5B are block diagram of examples of aspects of a system, in accordance with embodiments of the present invention.
Figure 5B:
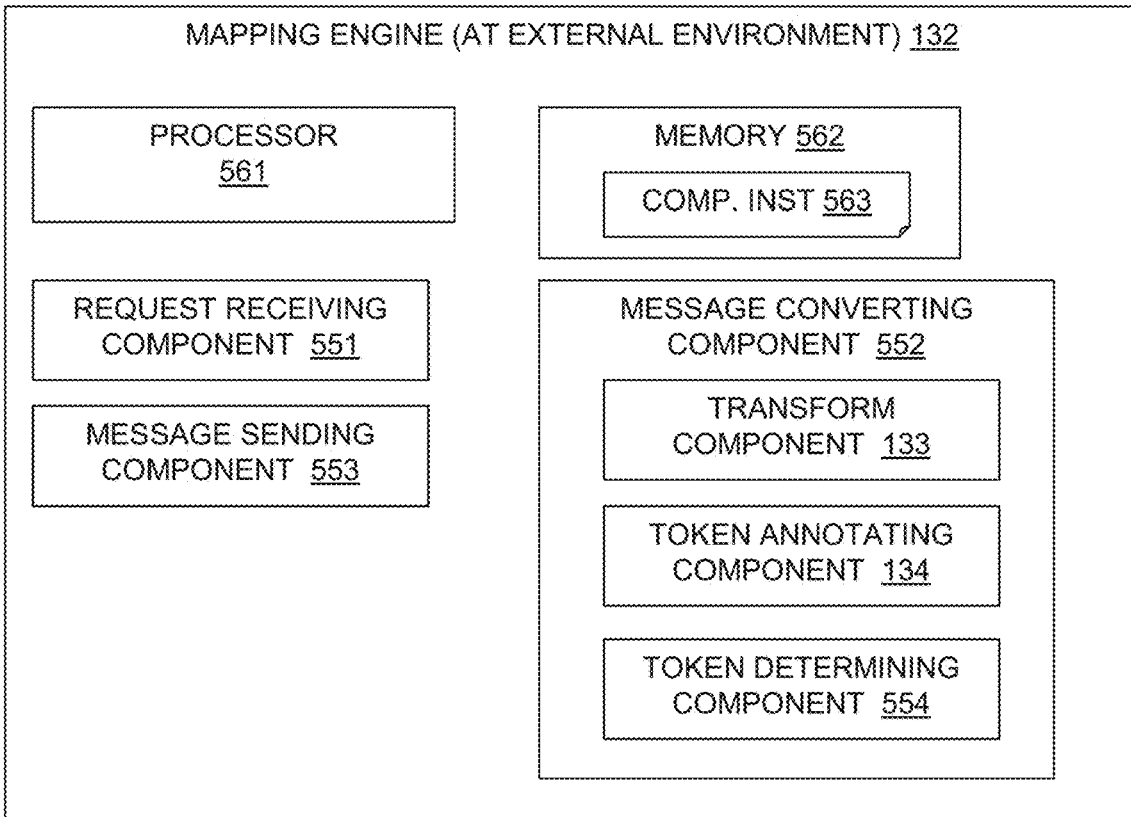

FIGS. 5A and 5B are block diagram of examples of aspects of a system, in accordance with embodiments of the present invention.

Referring to FIG. 5A, a block diagram shows a secure computer system in the form of a mapping engine 112 at a secure environment as shown in FIG. 1. The mapping engine 112 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The mapping engine 112 may provide a system for sending a message request for processing of a portion of an application in an external environment.

The mapping engine 112 may include a request generating component 511 for generating a request message for processing a portion of an application at an external processing location.

The mapping engine 112 may include a sensitive data identify component 512 for identifying sensitive data in a data aspect of a request message and a tokenizing component 114 for tokenizing the sensitive data in a data aspect by replacing the sensitive data with tokenized data and storing a mapping 115 between the sensitive data and the tokenized data in the secure environment. A transform component 113 may also be provided for transforming non-sensitive data aspects of the request message for converting the data aspects of the request message into a format for external processing.

The mapping engine 112 may include a request sending component 513 for sending the request message for processing including the tokenized data to an external processing location and a response receiving component 514 for receiving a processed message from the external processing location including annotations for the tokenized data with transform instructions for the tokenized data.

The mapping engine 112 may include a de-tokenizing component 515 for replacing the tokenized data with the sensitive data by looking up the token mapping 115 and a transform performing component 516 for performing the transform instructions on the sensitive data.

The de-tokenizing component for replacing the tokenized data with the sensitive data and the transform performing component 516 for performing the transform instructions on the sensitive data may defer their operations until required at the secure environment.

Referring to FIG. 5B, a block diagram shows a system in the form of a mapping engine 132 at an external environment as shown in FIG. 1. The mapping engine 132 may include at least one processor 561, a hardware module, or a circuit for executing the functions of the described components which may be software units executing on the at least one processor. Multiple processors running parallel processing threads may be provided enabling parallel processing of some or all of the functions of the components. Memory 562 may be configured to provide computer instructions 563 to the at least one processor 561 to carry out the functionality of the components.

The mapping engine 132 may provide a system for receiving a message request from a secure environment for processing of a portion of an application in the external environment.

The mapping engine 132 may include a request receiving component 551 for receiving a request message at the external processing location for processing. The request message may include one or more data aspects having tokenized data.

The mapping engine 132 may include a message converting component 552 for converting the request message by applying one or more transforms to the data aspects including replacing a tokenized value of a data aspect with annotated tokenized data with transform instructions. The message converting component 552 may include a transform component 133 for applying transforms to non-tokenized data aspects and a token annotating component 134 for annotating tokenized data aspects with transform instructions. The message converting component 552 may include a token determining component 554 for determining if a data aspect is tokenized, and, if the data aspect is not tokenized, applying a transform to the data aspect; if the data aspect is tokenized annotating the token with transform instructions.

The mapping engine 132 may include a message sending component 553 for sending a response message including the data aspects with annotated tokenized data with transform instructions to the secure environment for replacing the tokenized data with the sensitive data and performing the transform instructions on the sensitive data. Alternatively, the message sending component 553 may forward the message to a next processing node in the external environment for further processing before returning to the secure environment.

Figure 6:
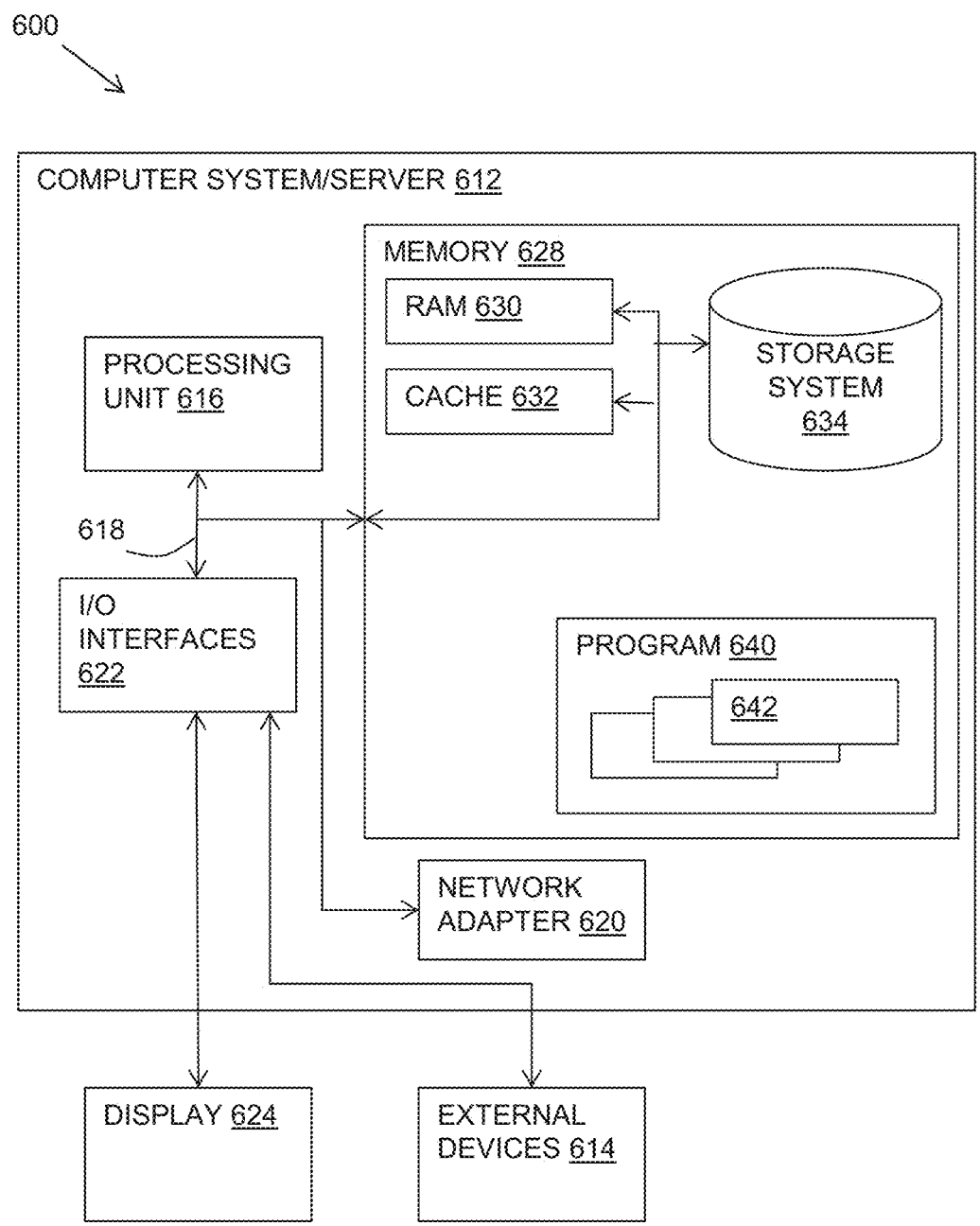
FIG. 6 is a block diagram of an embodiment of a computer system or cloud server in which the present invention may be implemented.

FIG. 6 is a block diagram of an embodiment of a computer system or cloud server in which the present invention may be implemented.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
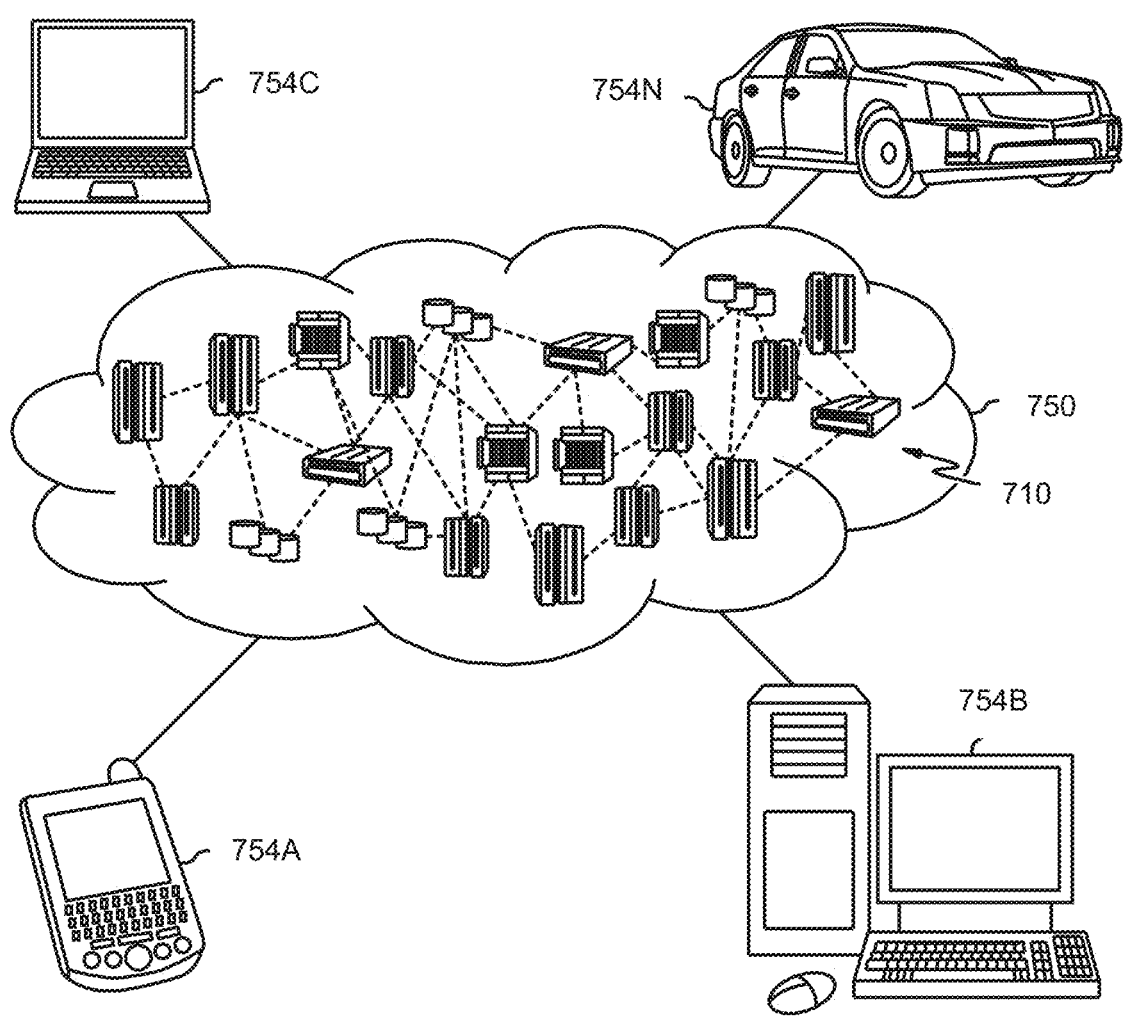
FIG. 7 depicts a cloud computing environment according to an embodiment of the present invention.

FIG. 7 depicts a cloud computing environment 750 according to an embodiment of the present invention. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
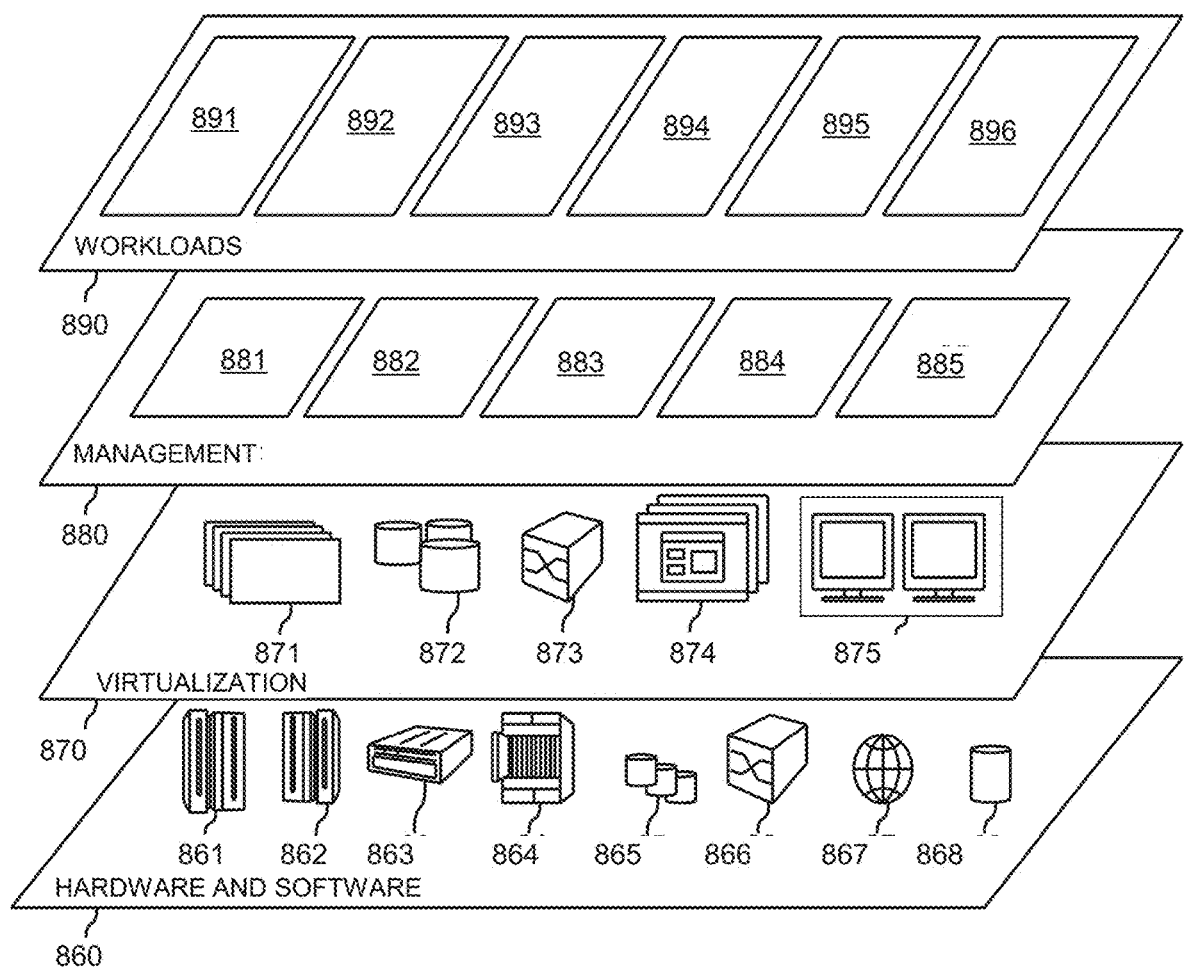
FIG. 8 depicts abstraction model layers of a cloud computing environment according to an embodiment of the present invention.

FIG. 8 depicts abstraction layers of a cloud computing environment 750 (FIG. 7) according to an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and message transformation processing 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for handling sensitive data required by an application in a secure computer system comprising one or more processors, said method comprising:
    said one or more processors transforming a request message from a data format required by the application into a data format required by a service in an external computer system that is external to the secure computer system, said transforming including transforming sensitive data in one or more data aspects of the request message, and additional data aspects of the request message, from the data format required by the application into the data format required by the service, said sensitive data needed by the service to provide information to the application;
    after said transforming the request message, said one or more processors tokenizing the transformed sensitive data in the one or more data aspects in the transformed request message by replacing the transformed sensitive data with tokenized data in the transformed request message and storing a mapping between the transformed sensitive data and the tokenized data in the secure computer system;
    said one or more processors sending the transformed request message including the tokenized data to the external computer system;
    after said sending the transformed request message, said one or more processors receiving a response message from the external computer system, said response message including: the additional data aspects transformed from the data format required by the service into the data format required by the application; the tokenized data in the one or more data aspects, and annotations with transform instructions for transforming the transformed sensitive data, from the data format required by the service into the data format required by the application, after the tokenized data has been replaced by the transformed sensitive data in the one or more data aspects; and
    said one or more processors replacing, by utilizing the mapping, the tokenized data in the one or more data aspect of the response message with the sensitive data.

2. The method of claim 1, said method further comprising:
    after said replacing the tokenized data, said one or more processors performing the transform instructions on the sensitive data in the one or more data aspect of the response message, which changes the sensitive data in the one or more data aspect of the response message from the data format required by the service into the data format required by the application.

3. The method of claim 1, wherein said identifying sensitive data in the one or more data aspects of the request message includes reading metadata from a message model and identifying the sensitive data as being the data in the one or more data aspects of the request message that matches the metadata read from the message model.

4. The method of claim 1, wherein said replacing the tokenized data with the sensitive data and performing the transform instructions on the sensitive data are deferred until the sensitive data is required by the application and are implemented in response to a determination that the sensitive data is required by the application.

5. The method of claim 1, wherein the transform instructions include single-element functions acting on a single token or multi-element functions acting on multiple tokens or a mixture of tokens and literal values.

6. The method of claim 1, wherein the transform instructions include database or cache look-up instructions for look-up of a value in a database or a distributed cache.

7. The method of claim 1, wherein the transform instructions include database or cache look-up instructions, and wherein the output from execution of the look-up instructions is mapped to a field in an outbound message that is marked as secure for subsequent tokenization if processed outside the secure computer system.

8. The method of claim 1, wherein the transform instructions are pure functional transformations whose processing can be separated based on a sensitivity of input data.

9. The method of claim 1, wherein the method further comprises:
    said one or more processors processing the application for cloud bursting when additional resources are needed.

10. The method of claim 1, wherein the application is a distributed application, and wherein the method further comprises:
    said one or more processors processing a portion of the distributed application.

11. A data processing system, comprising a secure computer system that includes one or more processors, one or more memories, and one or more computer readable hardware storage devices, said one or more hardware storage device containing program code executable by the one or more processors via the one or more memories to implement a method for handling sensitive data required by an application in the secure computer system, said method comprising:
    said one or more processors transforming a request message from a data format required by the application into a data format required by a service in an external computer system that is external to the secure computer system, said transforming including transforming sensitive data in one or more data aspects of the request message, and additional data aspects of the request message, from the data format required by the application into the data format required by the service, said sensitive data needed by the service to provide information to the application;
    after said transforming the request message, said one or more processors tokenizing the transformed sensitive data in the one or more data aspects in the transformed request message by replacing the transformed sensitive data with tokenized data in the transformed request message and storing a mapping between the transformed sensitive data and the tokenized data in the secure computer system;
    said one or more processors sending the transformed request message including the tokenized data to the external computer system;
    after said sending the transformed request message, said one or more processors receiving a response message from the external computer system, said response message including: the additional data aspects transformed from the data format required by the service into the data format required by the application; the tokenized data in the one or more data aspects, and annotations with transform instructions for transforming the transformed sensitive data, from the data format required by the service into the data format required by the application, after the tokenized data has been replaced by the transformed sensitive data in the one or more data aspects; and said one or more processors replacing, by utilizing the mapping, the tokenized data in the one or more data aspect of the response message with the sensitive data.

12. The data processing system of claim 11, said method further comprising:

after said replacing the tokenized data, said one or more processors performing the transform instructions on the sensitive data in the one or more data aspect of the response message, which changes the sensitive data in the one or more data aspect of the response message from the data format required by the service into the data format required by the application.

13. The data processing system of claim 11, wherein said identifying sensitive data in the one or more data aspects of the request message includes reading metadata from a message model and identifying the sensitive data as being the data in the one or more data aspects of the request message that matches the metadata read from the message model.

14. The data processing system of claim 11, wherein said replacing the tokenized data with the sensitive data and performing the transform instructions on the sensitive data are deferred until the sensitive data is required by the application and are implemented in response to a determination that the sensitive data is required by the application.

15. The data processing system of claim 11, wherein the transform instructions include single-element functions acting on a single token or multi-element functions acting on multiple tokens or a mixture of tokens and literal values.

16. A computer program product, comprising one or more computer readable hardware storage devices having computer readable program code stored therein, said program code containing instructions executable by one or more processors of a secure computer system to implement a method for handling sensitive data required by an application in the secure computer system, said method comprising:

said one or more processors transforming a request message from a data format required by the application into a data format required by a service in an external computer system that is external to the secure computer system, said transforming including transforming sensitive data in one or more data aspects of the request message, and additional data aspects of the request message, from the data format required by the application into the data format required by the service, said sensitive data needed by the service to provide information to the application;

after said transforming the request message, said one or more processors tokenizing the transformed sensitive data in the one or more data aspects in the transformed request message by replacing the transformed sensitive data with tokenized data in the transformed request message and storing a mapping between the transformed sensitive data and the tokenized data in the secure computer system;

said one or more processors sending the transformed request message including the tokenized data to the external computer system;

after said sending the transformed request message, said one or more processors receiving a response message from the external computer system, said response message including: the additional data aspects transformed from the data format required by the service into the data format required by the application; the tokenized data in the one or more data aspects, and annotations with transform instructions for transforming the transformed sensitive data, from the data format required by the service into the data format required by the application, after the tokenized data has been replaced by the transformed sensitive data in the one or more data aspects; and said one or more processors replacing, by utilizing the mapping, the tokenized data in the one or more data aspect of the response message with the sensitive data.

17. The computer program product of claim 16, said method further comprising:

after said replacing the tokenized data, said one or more processors performing the transform instructions on the sensitive data in the one or more data aspect of the response message, which changes the sensitive data in the one or more data aspect of the response message from the data format required by the service into the data format required by the application.

18. The computer program product of claim 16, wherein said identifying sensitive data in the one or more data aspects of the request message includes reading metadata from a message model and identifying the sensitive data as being the data in the one or more data aspects of the request message that matches the metadata read from the message model.

19. The computer program product of claim 16, wherein said replacing the tokenized data with the sensitive data and performing the transform instructions on the sensitive data are deferred until the sensitive data is required by the application and are implemented in response to a determination that the sensitive data is required by the application.

20. The computer program product of claim 16, wherein the transform instructions include single-element functions acting on a single token or multi-element functions acting on multiple tokens or a mixture of tokens and literal values.

* * * * *